UNITED STATES PATENT OFFICE.

ALEXANDER R. TILLINGHAST, OF SOLVAY, NEW YORK, ASSIGNOR TO SEMET-SOLVAY COMPANY, OF SOLVAY, NEW YORK, A CORPORATION OF NEW YORK.

PROCESS OF MAKING SODIUM FERROCYANID.

1,252,741.  Specification of Letters Patent.  Patented Jan. 8, 1918.

No Drawing.  Application filed December 20, 1916. Serial No. 137,970.

*To all whom it may concern:*

Be it known that I, ALEXANDER R. TILLINGHAST, a citizen of the United States, residing at Solvay, in the county of Onondaga and State of New York, have invented a new and Improved Process of Making Sodium Ferrocyanid, of which the following is a specification.

As is well known, sodium ferrocyanid may be formed by effecting the combination with carbonate of iron and an alkali of hydrocyanic acid gas as obtained from the gases evolved in the destructive distillation of coal. A difficulty experienced in such a process is the loss of cyanogen due to the formation, with ammonia of the gas, of ammonium ferrocyanid.

The object of my improvements is to obviate such loss and provide a means for producing the sodium ferrocyanid in other respects in a convenient and economical manner.

In carrying my process into effect I first remove the ammonia constituent of the gas therefrom as completely as may be in any usual or convenient manner, as by causing the absorption of the ammonia in water. The gas containing the cyanogen is then scrubbed with water containing ferrous carbonate, or its equivalent, ferrous hydrate, in suspension and also soda ash ($Na_2CO_3$) in solution in sufficient quantity to insure the alkalinity of the ferrous carbonate. While the carbonate of iron employed may be obtained from any suitable source, I prefer to form it by dissolving in water copperas and soda ash. Upon agitating this mixture the following reaction occurs:

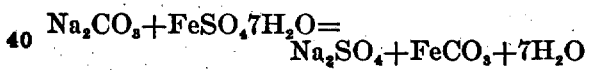

Ferroushydrate is formed in substantially the same manner by treating copperas with caustic soda. The ferrous carbonate is separated from the liquor either by settling out and decanting off the liquor or by filtration. The ferrous carbonate is then thoroughly washed until any remaining sulfate of soda is eliminated, when the ferrous carbonate is ready for use.

The ferrous carbonate suspension is formed by agitating in water approximately eight parts of ferrous carbonate with five parts of soda ash. Upon scrubbing the gas with this, reactions take place which may be expressed as follows:

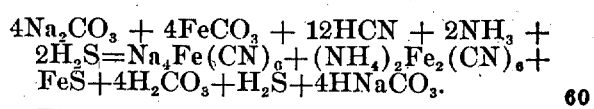

The liquor from the scrubber contains sodium ferrocyanid, which is in solution, soda ash in solution, probably all of which exists as bicarbonate of soda, a large excess of ferrous sulfid in the form of a black, insoluble sludge and a considerable quantity of insoluble ammonia ferro-ferrocyanid due to the presence of unseparated ammonia in the gas.

In order to convert this insoluble ferrocyanid, and any other insoluble ferrocyanid that may be present, to the soluble form, milk of lime is added to the mixture which is then boiled and allowed to settle. The amount of lime added is such as is necessary to effect the desired reaction, i. e. on an average from .1 to .5 of a pound of milk of lime to each gallon of liquor. The lime converts the bicarbonate and carbonate of soda present into caustic soda as follows:

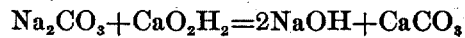

and

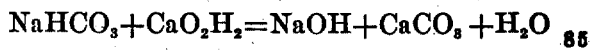

which in turn converts the insoluble ferrocyanids into soluble ferrocyanid as according to the reaction:

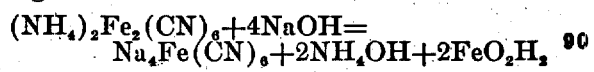

The addition of the milk of lime not only effects the conversion of the insoluble ferrocyanid into the soluble form but also facilitates the eventual settling of the insoluble sludge which is carried down with the calcium carbonate, and moreover, by reason of the consequent conversion of the soda ash into caustic soda, which is much more soluble than soda ash, prevents crystallization of sodium carbonate and consequent contamination of the product thereby.

After the desired reactions are effected the insoluble residue is allowed to settle out and the clear liquor is drawn off and concentrated to the point of crystallization after which it is run into pans and the ferrocyanid allowed to crystallize out.

In order to purify the product the crystals are separated from the mother liquor and again dissolved in water or mother liquor from the previous final crystallization after which the solution is concentrated to the required strength and the ferrocyanid is again allowed to crystallize on strings, or other bases, suspended in the liquor. The finished crystals are removed from the strings, washed, drained and dried and are then ready for shipment.

Having thus described my invention, what I claim as new and desire to secure by Letters Patent is:

1. The process of forming sodium ferrocyanid from the cyanogen content of gas resulting from the distillation of coal which consists in removing the ammonia from the gas, scrubbing the gas with a solution of soda ash having ferrous carbonate in suspension, treating the resulting solution with milk of lime so as to form caustic soda and convert insoluble ferrocyanids present into soluble ferrocyanid and finally separating the insoluble matter from the solution and crystallizing out the ferrocyanid.

2. The process of forming sodium ferrocyanid from the cyanogen content of gas resulting from the distillation of coal which consists in scrubbing the gas with a solution of soda ash having ferrous carbonate in suspension, treating the resulting solution with milk of lime so as to form caustic soda and convert insoluble ferrocyanids into soluble ferrocyanid and finally separating the insoluble matter from the solution and crystallizing out the ferrocyanid.

3. The improvement in the process of forming sodium ferrocyanid which consists in treating a solution containing soda ash in solution and insoluble ferrocyanid with milk of lime so as to convert the soda ash into caustic soda and thereby break up the insoluble ferrocyanid and form soluble ferrocyanid.

4. The improvement in the process of forming sodium ferrocyanid which consists in treating a solution containing sodium ferrocyanid and soda ash with milk of lime to convert the soda ash into more soluble caustic soda, separating the insoluble matter from the solution and finally crystallizing out the sodium ferrocyanid leaving caustic soda in solution.

In testimony whereof I have affixed my signature, this 16th day of December 1916.

ALEXANDER R. TILLINGHAST.